United States Patent [19]

Long

[11] Patent Number: 5,069,348

[45] Date of Patent: Dec. 3, 1991

[54] MOTORCYCLE CLEANING AID

[76] Inventor: Edward A. Long, 244 E. First Ave., Roselle, N.J. 07203

[21] Appl. No.: 394,230

[22] Filed: Aug. 15, 1989

[51] Int. Cl.⁵ ................................................ A47F 5/00
[52] U.S. Cl. .......................................... 211/24; 211/22
[58] Field of Search ....................... 211/20, 22, 23, 24, 211/21; 272/73, 73.1

[56] References Cited

U.S. PATENT DOCUMENTS

| 359,800 | 3/1887 | McClintock | 211/20 |
|---|---|---|---|
| 698,231 | 4/1902 | Starzman | 211/24 |
| 2,805,860 | 9/1957 | Littig | 211/22 X |
| 3,724,844 | 4/1973 | Olmstead et al. | 211/22 X |
| 4,026,546 | 5/1977 | Omori | 211/22 X |
| 4,421,308 | 12/1983 | Nagy | 211/22 X |
| 4,550,835 | 11/1985 | Lynch | 211/24 |
| 4,941,651 | 7/1990 | Phillips | 272/73 |

Primary Examiner—Robert W. Gibson, Jr.
Attorney, Agent, or Firm—Lerner, David, Littenberg, Krumholz & Mentlik

[57] ABSTRACT

A wheel tool is disclosed to aid in the cleaning or repair of a wheel of a vehicle, particularly two- or three-wheel vehicles, and includes a wheel support on which the wheel of a vehicle is to rest and permitting the free rotation of the wheel without moving the vehicle, and a side support set at an adjustable obtuse angle to the wheel support so that the side support engages the side portion of the wheel which is on the wheel support to further support the wheel, the side support also permitting the free rotation of the wheel without moving the vehicle.

23 Claims, 2 Drawing Sheets

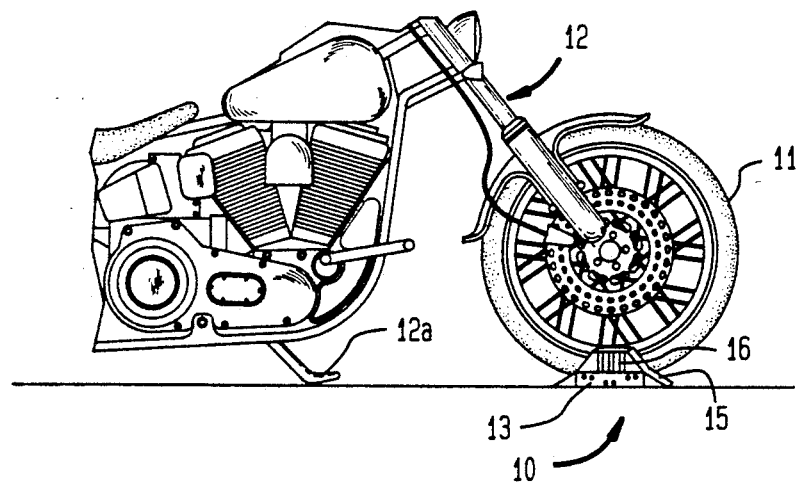
FIG. 1
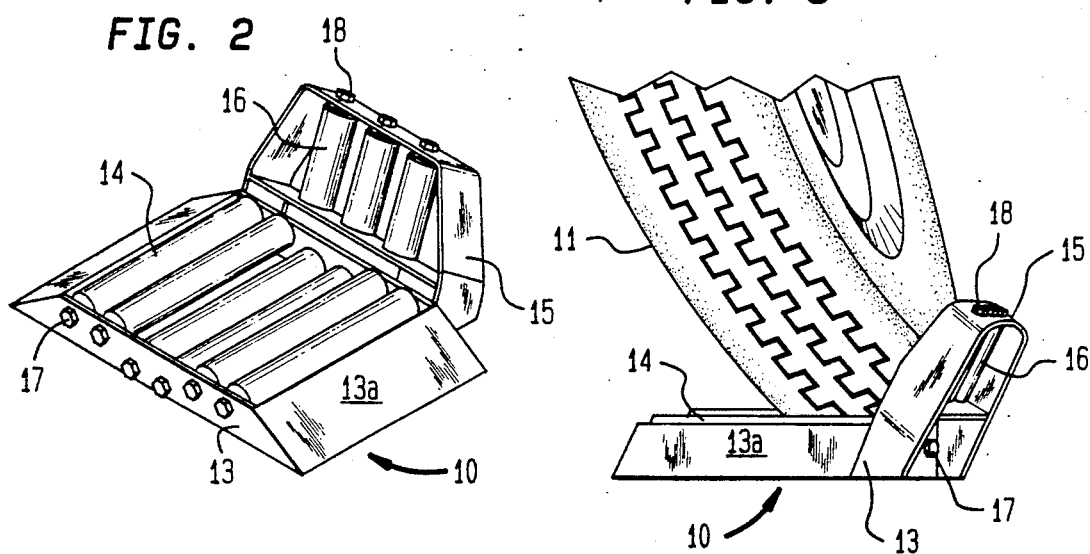
FIG. 2
FIG. 3
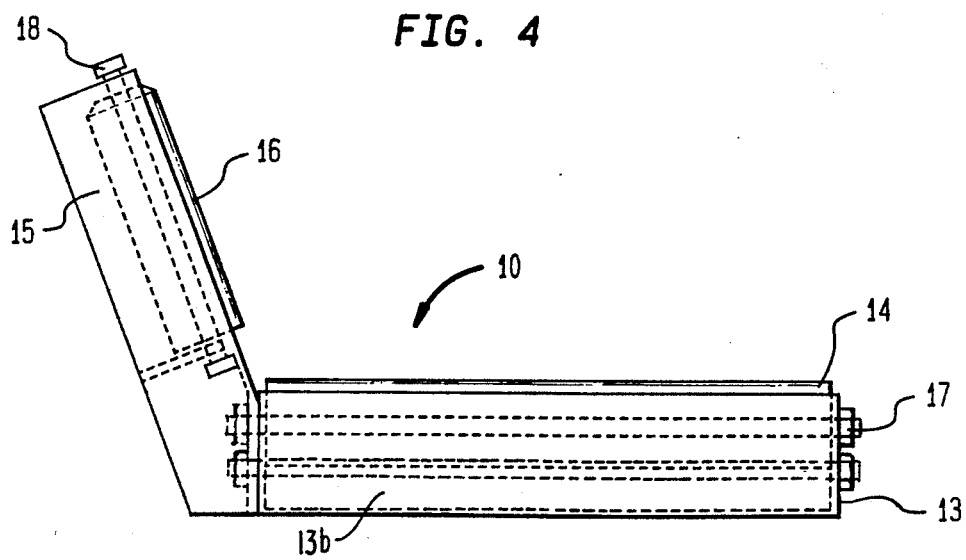
FIG. 4

MOTORCYCLE CLEANING AID

BACKGROUND OF THE INVENTION

The present invention relates to the art of motorcycle maintenance. Generally, it concerns the cleaning of a motorcycle's wheels, and more particularly it concerns a device for supporting a wheel of a motorcycle so that the wheel can be cleaned without moving the motorcycle.

The cleaning of wheels on vehicles, particularly motorcycles or three-wheel vehicles, is particularly time-consuming because of the plurality of spokes to be cleaned, or the complexity of the breaking mechanism which often needs attention. The spokes and rims of the wheel are often made of chrome, bimetallic materials or other materials which require much attention to clean and maintain in safe operating condition.

Typically, the motorcycle or other vehicle is put up on its kickstand while a portion of the wheel is being cleaned. Once the cleaning of that portion of the wheel has been completed, the motorcycle or other vehicle must be moved so that another portion of the wheel is exposed for cleaning This not only requires the interruption of the cleaning process, but requires the maneuvering of the motorcycle or other vehicle so that it is in the proper position. Thus, a great deal of room is required so that the motorcycle or other vehicle can be properly positioned. This could present problems for those having smaller storage areas or garages. Indeed, lack of space for such purposes is typical as most motorcycle owners also own another vehicle for use in inclement weather. Thus, the motorcycle owner would have a garage with not only the motorcycle in it, but also their car, truck, or other large vehicle.

Presently, there exists no device or tool to facilitate the cleaning of a motorcycle wheel at any given place. It is therefore desirable to provide a wheel cleaning tool which is easily transportable in one's saddle bags and can be easily assembled and used at any given place —perhaps at motorcycle shows where many ride their motorcycles to the shows, yet want to clean road dirt from the wheels upon arriving at the show. Thus, the motorcycle wheel cleaning tool should be small lightweight and portable.

SUMMARY OF THE INVENTION

The present invention specifically relates to a wheel tool to facilitate the cleaning of a vehicle's wheels. The wheel stand includes a base having a first and second side, a front and a rear. A wheel support is disposed between the first and second sides of the base member, and are adapted to support the wheel of a vehicle while permitting the free rotation of the wheel towards the front or rear of the base member without moving the vehicle The front and/or the rear of the base member can include a ramp to facilitate the rolling of the wheel onto and off of the wheel tool. The wheel tool should be lightweight and portable so that it is easily transported from place to place.

In a further embodiment of the wheel tool in accordance with the present invention, a side support is provided for engaging the side portion the wheel which is primarily supported by the wheel support on the base member. The side support is also constructed and arranged to permit the free rotation of the wheel toward the front or rear of the base member without moving the vehicle. The side support is particularly useful when the wheel to be supported is the turning wheel of a two-or three-wheel vehicle The side of the turning wheel bears against the side support so as to further support the turning wheel from coming off the wheel stand. To facilitate this support, the side support can be positioned at an angle to an imaginary vertical plane, or, in other words, the side support can be positioned such that the side support is at an angle of greater than 90° to the wheel support (substantially horizontal) on the base member. Still further, the side support can be removably attached to the base member.

Accordingly, it is an object of the present invention to provide a wheel tool on which the wheel of a vehicle can rest while permitting the free rotation of the wheel without moving the vehicle.

It is another object of the present invention to provide a wheel tool having a wheel support for the wheel of a vehicle to rest upon, and a side support to further support the wheel of a vehicle by bearing against the side portion of the wheel, both the wheel support and the side support being constructed and arranged to permit the free rotation of the wheel without moving the vehicle.

It is another object of the present invention to provide a wheel tool as described in the preceding paragraph wherein the side support is removably to the base member which carries the wheel support.

It is another object of the present invention to provide a wheel tool as described in the preceding paragraphs wherein the wheel tool is relatively small and lightweight so that it is easily transportable from place to place.

BRIEF DESCRIPTION OF THE DRAWINGS

The foregoing and other objects of the present invention will become apparent, as will a better understanding of the concepts underlying the present invention, by reference to the description which follows and refers to the accompanying drawings in which:

FIG. 1 is a side elevational view of a motorcycle as supported on a wheel tool in accordance with the present invention;

FIG. 2 is a rear perspective view of a wheel tool in accordance with the present invention;

FIG. 3 is a rear elevational view of the front turning wheel of the motorcycle shown in FIG. 1 in accordance with the present invention;

FIG. 4 is a front elevational view of the wheel tool in accordance with the present invention;

DETAILED DESCRIPTION

Figure 5:
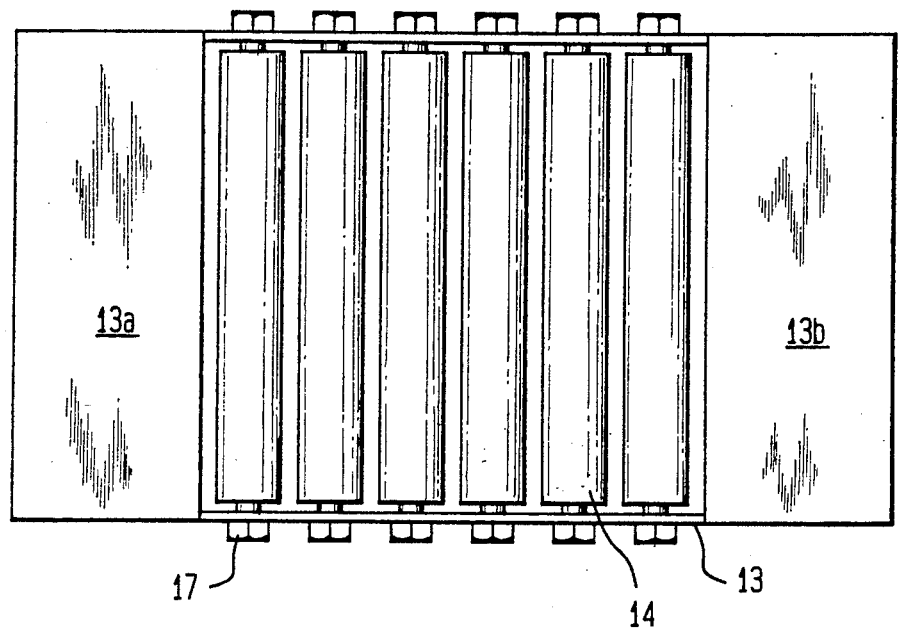
FIG. 5 is a top plan view of the base member and wheel support means of the wheel tool shown in FIG. 4.

Referring to the figures, FIGS. 1 and 3 illustrate the manner in which the wheel tool in accordance with the present invention is to be employed. These figures illustrate the front wheel of a motorcycle resting on the wheel tool which is generally designated as 10 in accordance with the present invention. It is noted that it is the kickstand 12a which supports the entire motorcycle 12 against tipping. The bottom portion of the wheel 11 of the motorcycle 12 rests on the base member 13, or more particularly, the wheel support means 14 (which will be described in more detail below) as it would on the ground. The side portion of the wheel 11 bears against the side attachment member 15, or more particularly, the side support means 16 (which will be described in more detail below).

Accordingly, the arrangement shown in FIGS. 1 and 3 is particularly useful for front wheels of motorcycles and the like vehicles since it is the front wheel that turns to the side (to the left in FIGS. 1 and 3) when the kickstand 12a is used to hold up and fully support the motorcycle 12. The weight of the motorcycle 12 would thus be on the kickstand 12a on the left side of the motorcycle 12, and this might tend to make the lower portion of the wheel 11 move to the right when supported on the wheel support means 14. The side attachment member 15 and the side support means 16, however, prevent the wheel 11 from coming off the tool stand 10 by bearing against the side portion of the wheel 11. Of course, in accordance with the present invention, the wheel support means 14 and the side support means 16 permit the free rotation of the wheel 11 towards the rear of the motorcycle 12 or the front of the motorcycle 12, all as will be discussed further below.

The base member 13 further includes a rear ramp section 13a and a front ramp section 13b (the "front" and "rear" designations being consistent with that of the motorcycle 12). These ramp sections facilitate the movement of the motorcycle 12 onto and off of the base member 13.

It is important to note that the side attachment member 15 is disposed at an angle to an imaginary horizontal plane, that is, an obtuse angle with respect to the wheel support means 14 (which define a generally horizontal plane). It is noted that the angle of the side support means 16 can also be defined with respect to an imaginary vertical plane which passes through the first side of the base member 13, i.e., the side on which the side attachment member 15 is attached to the base member 13. The side attachment member 15 is adapted to accommodate differently sized wheels, as will be described below.

Now referring to FIGS. 2–8, it becomes clear that the wheel support means 14 and the side support means 16 in the preferred embodiment of the present invention comprise cylindrical members which are attached to the base member 13 and the side attachment member 15, respectively, so that they are rotatable. More specifically, the rotatable cylindrical members which comprise the wheel support means 14 are disposed, in side by side relationship, between first and second sides of the base member 13. As can be seen in FIGS. 2–5, fastening means 17 rotatably attach these cylindrical members to the base member 13; whereas FIGS. 2–4, 7 and 8 show fastening means 18 for rotatably attaching to the side attachment member 15 the cylindrical members which comprise the side support means 16. It is noted that the cylindrical members can be made of virtually any material, it being found that PVC solid round stock is quite adaptable for the purpose of the present invention. Further, no ball bearing arrangement or any other friction reducing means is required Indeed, some restriction in the rolling of the cylindrical members is desirable as this might prevent the wheel 11 from coming off the wheel tool 10 when on an inclined surface, yet permit the free turning of the wheel 11 when cleaning.

Figure 6:
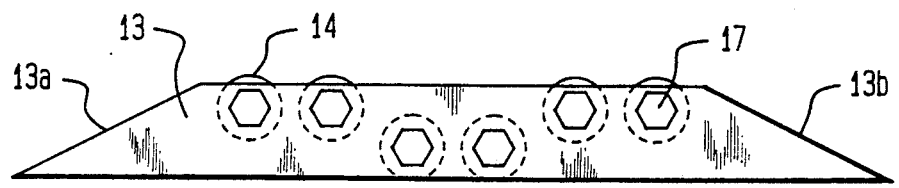
FIG. 6 is a side elevational view of the base member and wheel support means shown in FIG. 5.

By referring to FIGS. 2 and 6, the specific arrangement of the cylindrical members which comprise the wheel support means 14 can be seen. It is significant that the intermediate cylindrical members are rotatably attached to the base member 13 at locations which are lower than the outer cylindrical members. Indeed, FIG. 6 shows that the cylindrical members which comprise the wheel support means 14 are arranged in a generally flattened U-shaped configuration. This arcuate arrangement matches the curvature of the wheel 11 so that a greater surface area of the wheel 11 is in contact with the wheel support means 14. If such a configuration is not utilized, only a very small portion of the wheel 11 would be in contact with the wheel support means 14, thereby providing less support for the wheel 11, as well as less rotatability of the wheel 11.

Figure 7:
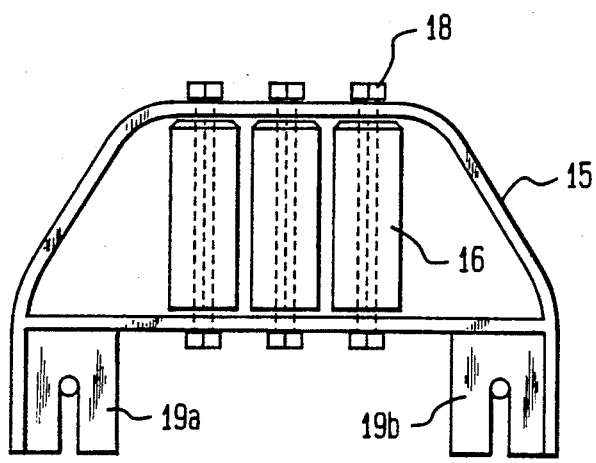
FIG. 7 is a side elevational view of the side attachment and side support means of the wheel tool shown in FIG. 4, the side attachment member shown herein being readily adaptable for attachment to the base member shown in FIG. 6.
Figure 8:
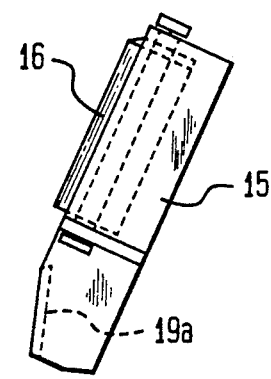
FIG. 8 is a rear elevational view of the side attachment member and side support means shown in FIG. 7.

FIGS. 7 and 8 show the side attachment member 15 in more detail. Specifically, in addition to the side support means 16 (which are comprised of rotatable cylindrical members), slotted members 19a and 19b are provided. These slotted members are adapted to be attached to the base member 13 by the two fastening means 17 on either end of the base member 13, as shown in FIG. 6. In this manner, the side attachment member 15 can be easily removed from the base member 13. When assemble with the base member 13, the slotted members 19a and 19b also rest on the ground as does the bottom of the base member 13.

It is important to note that the rotatable cylindrical members which make up the side support means 16 are of a specific length which, when assembled with the base member 13, permit the wheel tool 10 to accommodate wheels of different sizes. With wheels of smaller widths, the side portion of the wheel would bear against the lower portions of the rotatable cylindrical members which make up the side support means 16; whereas with wheels of greater widths, the side portions of such wide wheels would bear against the upper portions of the rotatable cylindrical members which make up the side support means 16.

Of great importance to the fulfillment of the concepts underlying the present invention, the wheel tool 10 is relatively small so that it is lightweight and easily transportable. This is also the advantage to having the side attachment member 15 removable from the base member 13. Thus, the overall length of the base member 13, front ramp to rear ramp, is approximately 10 inches. The basic frame of base member 13 as well as the side attachment member 15 is made of 1 inch by $\frac{1}{8}$ inch flat stock The width of the base member 13 is approximately 5$\frac{1}{2}$ inches, or 5$\frac{3}{4}$ inches if the heads of the bolts (fasteners) are included. The rotatable cylindrical members are $\frac{3}{4}$ inch in diameter and approximately 5 inches in length so as to fit between the frame of a base member 13. The base member 13 is approximate 1 inch in height. Since the outer rotatable cylindrical members extend beyond the top of the base member 13 in accordance with the preferred embodiment herein, the overall height to the top of the rotatable cylindrical members is approximately 1$\frac{1}{8}$ inches. The side attachment member 15 is approximately 6 inches long, the slotted members 19a and 19b being approximately 4$\frac{3}{4}$ inches center to center. This would mean that the; bolts which hold the outer rotatable cylindrical members to the base member 13 must also be approximately 4$\frac{3}{4}$ inches center to center so that the side attachment member 15 can be attached thereto. The slotted portion of the slotted members 19a and 19b is approximately ¾ of an inch in length, while the entire slotted member is approximately 1½ inches in length. As noted above, the rotatable cylindrical members which make up the side support means 16 are of a particular length so that the wheel tool 10 can accommodate wheels of different sizes. The size which has been found to be optimum for the purposes described herein is within the range of 2-3 inches, or in the preferred embodiment approximately 2 1/16 inches in length. Thus, with this arrangement, the bottom of the rotatable cylindrical members which make up the side support means 16 would start at approximately 1⅝ inches from the ground on which the wheel tool 10 is placed, or about ⅝ of an inch from the top of the base member 13.

In use, one would roll the wheel of a motorcycle or other vehicle up the ramp section 13a and onto the wheel support means 14. The kickstand 12a of the motorcycle 12 should be on the side opposite to the side attachment member 15 so that when it is put in place to support the motorcycle 12, the wheel 11 turns away from the side attachment member 15. In this manner, the side portion of the wheel 11 will bear against the side support means 16. The wheel 11 is now in position to be cleaned with minimal amount of space and energy. When one portion of the wheel 11 is properly cleaned, one need only rotate the wheel 11 in order to clean another portion thereof. With the particular arrangement of the wheel tool in accordance with the present invention, the motorcycle 12 will not move when the wheel 11 is rotated.

While the foregoing description and figures illustrate the preferred embodiment of the wheel tool in accordance with the present invention, it should be appreciated that certain modifications could be made and are encouraged to be made in the structure of the disclosed embodiment without departing from the spirit and scope of the present invention which is intended to be captured by the claims set for immediately below.

I claim:

1. A portable wheel tool comprising,
   a. a base member having a first side, a second side, a front and a rear, wherein said base member is thin and light i weight so that it is easily transportable from place to place;
   b. wheel support means disposed between said first side and said second side of said base member for supporting a wheel of a vehicle, said wheel support means being so constructed and arranged to permit the free rotation of the wheel towards the front or rear of said base member without moving the vehicle; and
   c. side support means extending upwardly from said first side of said base member for providing additional support to the wheel of the vehicle, said side support means being positioned at an outwardly extending angle with respect to an imaginary vertical plane through said first side of said base member and being adapted to engage a side portion of the wheel when the vehicle is resting on the support means, said side support means being so constructed and arranged to permit the free rotation of the wheel toward the front or rear of said base member without moving the vehicle.

2. The portable wheel tool in claim 1, wherein said front of said base member includes a ramp section to facilitate the positioning of a vehicle on said support means.

3. The portable wheel tool in claim 2, wherein said rear of said base member includes a ramp section to facilitate the positioning of a vehicle on said support means.

4. The portable wheel tool in claim 2, wherein said side support means is on a side attachment member which is removable attached to said first side of said base member so that it can be removed prior to the transportation of the wheel tool.

5. The portable wheel tool in claim 4, wherein said rear of said base member includes a rear ramp section.

6. The wheel tool in claim 4, wherein the base member is no longer than about 10 inches in length, no wider than approximately 5¼ inches in width, and no taller than approximately 1 inch in height; and the side attachment member is no longer than approximately 6 inches in length, and extends no further than approximately 3 inches in height from the top of the base member.

7. A portable wheel tool to facilitate the cleaning of a wheel of a vehicle, said wheel tool comprising,
   a. a base member having a first side, a second side, a front and a rear wherein said base member is thin and light in weight so that it is easily transportable from place to place;
   b. a plurality of rotatable cylindrical members disposed in side-by-side relationship from said front to said rear of said base member, each of said cylindrical members having one end connected to said first side of said base member and the other end connected to said second side of said base member, such that a wheel of a vehicle which is resting on said cylindrical members is free to rotate towards the front or rear of said base member without moving the vehicle; and
   c. a side support member extending upwardly from said first side of said base member, said side support member including at least one rotatable cylindrical member disposed in a substantially transverse position with respect to said plurality of rotatable cylindrical members, said at least one rotatable cylindrical member being adapted to engage a portion of the tire on the wheel when the wheel is resting on said plurality of rotatable cylindrical members, such that the wheel is free to rotate towards the front or rear of said base member without moving the vehicle.

8. The portable wheel tool in claim 7, wherein said at least one rotatable cylindrical member on said side support member is disposed at an outwardly extending angle with respect to an imaginary vertical plane through said first side of said base member.

9. The portable wheel tool in claim 8, wherein said side support member is removably attached to said base member.

10. The portable wheel tool in claim 9, wherein at least of one of said plurality of rotatable cylindrical members connected to said base member includes fastening means for rotatably fastening one end of said at least one of said plurality of rotatable cylindrical members to said first side of said base member, and said side support member is removably attached to said base member by said fastening means.

11. The portable wheel tool in claim 10, wherein said front of said base member includes a ramp section.

12. The portable wheel tool in claim 11, wherein said rear of said base member includes a ramp section.

13. The portable wheel tool in claim 12, wherein the base member is no longer than about 10 inches in length, no wider than approximately 5½ inches in width, and no taller than approximately 1 inch in height; and the side support member is no longer than approximately 6 inches in length, and extends no further than approximately 3 inches in height from the top of the base member.

14. The portable wheel tool in claim 13, wherein each of said plurality of rotatable cylindrical members and said at least one rotatable cylindrical member are ¾ of an inch in diameter, and said at least rotatable cylindrical member is no greater than approximately 3 inches in length.

15. The portable wheel tool in claim 13, further including a side support member extending upwardly from said first side of said base member, said side support member including at least one rotatable cylindrical member disposed in a substantially transverse position with respect to said plurality of rotatable cylindrical members, said at least one rotatable cylindrical member being adapted to engage a portion of the tire on the wheel when the wheel is supported by said plurality of rotatable cylindrical members, such that the wheel is free to rotate towards said front or said rear of said base member without moving the vehicle.

16. The portable wheel tool in claim 15, wherein said at least one rotatable cylindrical member on said side support member is disposed at an outwardly extending angle with respect to said plurality of rotatable cylindrical members.

17. The portable wheel tool in claim 16, wherein said side support member is removably attached to said base member.

18. The portable wheel tool in claim 17, wherein at least of one of said plurality of rotatable cylindrical members connected to said base member includes fastening means for rotatably fastening one end of each of said plurality of rotatable cylindrical members to said first side of said base member, and said side support member is removably attached to said base member by said fastening means.

19. The portable wheel tool in claim 18, wherein said front of said base member includes a ramp section.

20. The portable wheel tool in claim 19, wherein said rear of said base member includes a ramp section.

21. The portable wheel tool in claim 20, wherein the base member is no longer than about 10 inches in length, no wider than approximately 5½ inches in width, and no taller than approximate 1 inch in height; and the side support member is no longer than approximately 6 inches in length, and extends no further than approximately 3 inches in height from the top of the base member.

22. The portable wheel tool in claim 21, wherein each of said plurality of rotatable cylindrical members and said at least one rotatable cylindrical member are ¾ of an inch in diameter, and said at least rotatable cylindrical member is no greater than approximately 3 inches in length.

23. A portable wheel tool to facilitate the cleaning of a wheel of a vehicle, said wheel tool comprising.
   a. a base member having a first side, a second side, a front and a rear wherein said base member is thin and light in weight so that it is easily transportable from place to place; and
   b. a plurality of rotatable cylindrical members disposed in side-by-side relationship from said front to said rear of said base member, each of said cylindrical members having one end connected to said first side of said base member and the other end connected to said second side of said base member, such that a wheel of a vehicle which is resting on said cylindrical members is free to rotate towards the front or rear of said base member without moving the vehicle, said plurality of rotatable cylindrical members being positioned from said front to said rear of said base member such that the intermediate outer cylindrical members are positioned lower than the cylindrical members adjacent to said front and said rear of said base member.

* * * * *

UNITED STATES PATENT AND TRADEMARK OFFICE
CERTIFICATE OF CORRECTION

PATENT NO. : 5,069,348　　　　　　　　　　　　Page 1 of 2
DATED : December 3, 1991
INVENTOR(S) : Edward A. Long It is certified that error appears in the above-identified patent and that said Letters Patent is hereby corrected as shown below:

Column 1, line 24, after "cleaning" and before "This" insert --.--.

Column 2, line 2, "two-or" should read --two- or--.

Column 2, line 2, after "vehicle" and before "The" insert --.--.

Column 3, line 66, after "required" and before "Indeed" insert --.--.

Column 4, line 29, "assemble" should read --assembled--.

Column 4, line 53, after "stock" and before "The" insert --.--.

Column 4, line 66, after "the" delete ";".

Column 5, line 41, "for" should read --forth--.

Column 5, line 46, "light i weight" should read --light in weight--.

UNITED STATES PATENT AND TRADEMARK OFFICE
CERTIFICATE OF CORRECTION

PATENT NO. : 5,069,348
DATED : December 3, 1991
INVENTOR(S) : Edward A. Long

It is certified that error appears in the above-identified patent and that said Letters Patent is hereby corrected as shown below:

Column 6, line 9, "removable" should read --removably--.

Column 6, line 16, "5 1/4" should read --5 1/2--.

Column 6, line 58, "least of one of" should read --least one of--.

Column 7, line 12, "at least rotatable" should read --at least one rotatable--.

Column 8, line 10, "approximate" should read --approximately--.

Column 8, line 18, "at least rotatable" should read --at least one rotatable--.

Signed and Sealed this

Thirtieth Day of March, 1993

Attest:

STEPHEN G. KUNIN

Attesting Officer           Acting Commissioner of Patents and Trademarks